United States Patent
Nakura et al.

(10) Patent No.: US 11,399,340 B2
(45) Date of Patent: Jul. 26, 2022

(54) CONTROLLER OF A RADIO ACCESS NETWORK

(71) Applicant: MITSUBISHI ELECTRIC CORPORATION, Tokyo (JP)

(72) Inventors: Kenichi Nakura, Tokyo (JP); Yukio Hirano, Tokyo (JP); Takeshi Suehiro, Tokyo (JP); Akiko Nagasawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 25 days.

(21) Appl. No.: 17/160,575

(22) Filed: Jan. 28, 2021

(65) Prior Publication Data
US 2021/0153113 A1    May 20, 2021

Related U.S. Application Data

(63) Continuation of application No. PCT/JP2018/033817, filed on Sep. 12, 2018.

(51) Int. Cl.
| | | |
|---|---|---|
| *H04W 4/00* | (2018.01) | |
| *G06F 15/173* | (2006.01) | |
| *H04L 12/28* | (2006.01) | |
| *H04W 48/18* | (2009.01) | |
| *H04W 4/70* | (2018.01) | |
| *H04W 24/02* | (2009.01) | |
| *H04W 28/16* | (2009.01) | |

(52) U.S. Cl.
CPC ............. *H04W 48/18* (2013.01); *H04W 4/70* (2018.02); *H04W 24/02* (2013.01); *H04W 28/16* (2013.01)

(58) Field of Classification Search
CPC ....... H04W 48/18; H04W 4/70; H04W 24/02; H04W 28/16

USPC ........................................................ 370/329
See application file for complete search history.

(56) References Cited

U.S. PATENT DOCUMENTS

| | | | | |
|---|---|---|---|---|
| 2005/0152289 A1* | 7/2005 | Nagata | ................. | H04L 12/462 370/256 |
| 2017/0208019 A1* | 7/2017 | Shimojou | ........... | H04L 41/5054 |

FOREIGN PATENT DOCUMENTS

| | | |
|---|---|---|
| JP | 2010-56818 A | 3/2010 |
| JP | 2015-154168 A | 8/2015 |
| JP | 2016-116184 A | 6/2016 |

OTHER PUBLICATIONS

Nagasawa et al., "A method for resource allocation for creating slices", IEICE 2018, 2 pages.

\* cited by examiner

*Primary Examiner* — Mark G. Pannell
(74) *Attorney, Agent, or Firm* — Birch, Stewart, Kolasch & Birch, LLP

(57) ABSTRACT

A controller of a radio access network calculates physical path resource information which is resource information about physical paths between devices in the network, and abstract path resource information which expresses the physical path resource information in a representative manner. When receiving a request to create a slice, the controller determines whether a slice that satisfies a requested condition is creatable based on the abstract path resource information and, when determining that the slice that satisfies the requested condition can be created, creates the slice by selecting a physical path that satisfies the requested condition based on the physical path resource information.

10 Claims, 13 Drawing Sheets

Fig. 3

Resource Information of Devices

| Device | Device Delay (us) | Capacity Utilization Rate | Port | Maximum Bandwidth (Gbps) |
|---|---|---|---|---|
| SW21 | 1 | 0.9 | 1 | 1 |
| | | | 2 | 1 |
| | | | 3 | 1 |
| | | | 4 | 10 |
| SW22 | 1 | 0.5 | 1 | 0.1 |
| | | | 2 | 0.1 |
| SW23 | 1 | 0.9 | 1 | 10 |
| | | | 2 | 10 |
| SW24 | 1 | 0.9 | 1 | 1 |
| | | | 2 | 1 |
| | | | 3 | 1 |
| OLT18 | 100 | 0.9 | 1 | 1 |
| | | | 2 | 1 |
| OLT19 | 100 | 0.9 | 1 | 1 |

Fig. 4

Connection Information of Devices

| Link | Starting Point Node | Ending Point Node | Transmission Delay (us) | Maximum Bandwidth (Gbps) | Available Bandwidth (Gbps) |
|---|---|---|---|---|---|
| L1 | ONU15−1 | OLT18−1 | 100 | 1 | 1 |
| L2 | ONU16−1 | OLT18−1 | 100 | 1 | 1 |
| L3 | OLT18−1 | SW21−1 | 1 | 1 | 1 |
| L4 | SW21−3 | SW22−1 | 1 | 0.1 | 0.1 |
| L5 | SW22−2 | SW24−1 | 1 | 0.1 | 0.1 |
| L6 | SW21−4 | SW23−1 | 200 | 10 | 10 |
| L7 | SW23−2 | SW24−2 | 1 | 1 | 1 |
| L8 | SW24−3 | SW31−1 | 1 | 1 | 1 |

Fig. 5

Physical Path1  CU13 → ONU15 —L1→ OLT18 —L3→ SW21 —L4→ SW22 —L5→ SW24 —L8→ SW31

Physical Path 2: CU13 → ONU15 —L1→ OLT18 —L3→ SW21 —L6→ SW23 —L7→ SW24 —L8→ SW31

Physical Path3: CU13 → ONU15 —L1→ OLT18 —L3→ SW21 (L4→ SW22 —L5→ / L6→ SW23 —L7→) SW24 —L8→ SW31

Fig. 6

Physical Path Information About
Physical Paths Between CU13⇔SW31

| Physical Path | Delay Amount(us) | Maximum Bandwidth (Gbps) | Capacity Utilization Rate | Available Bandwidth (Gbps) |
|---|---|---|---|---|
| 1 | 308 | 0.1 | 0.32 | 0.1 |
| 2 | 504 | 1.0 | 0.59 | 1.0 |
| 3-1 | 504 | 1.1 | 0.29 | 1.1 |
| 3-2 | 504 | 0.1 | 0.62 | 0.1 |

Fig. 7

Abstract Path Resource Information

| Abstract Path | End Point1 | End Point2 | Min Delay Amount(us) | Max Bandwidth at Min Delay(Gbps) | Max Bandwidth without Delay (Gbps) | Highest Cap. Utilization Rate |
|---|---|---|---|---|---|---|
| 1 | CU13 | SW31 | 308 | 0.1 | 1.1 | 0.62 |
| 2 | CU14 | SW31 | *** | ** | ** | *** |
| 3 | DU12 | SW31 | *** | ** | ** | *** |

Fig. 9

Slice Creation Request

| Request ID | End Point1 | End Point2 | Delay Amount (us) | Bandwidth (Gbps) | Capacity Utilization Rate |
|---|---|---|---|---|---|
| 1 | CU13 | SW31 | 200 | 0.05 | 0.1 |
| 2 | CU13 | SW31 | 400 | 0.05 | 0.1 |
| 3 | CU13 | SW31 | 600 | 1.0 | 0.1 |
| 4 | CU13 | SW31 | 600 | 0.05 | 0.6 |

Fig. 10

Physical Path Resource Information About
Physical Paths Between CU13⇔SW31

| Physical Path | Delay Amount(us) | Maximum Bandwidth (Gbps) | Capacity Utilization Rate | Available Bandwidth (Gbps) |
|---|---|---|---|---|
| 1 | 308 | 0.1 | 0.32 | 0.05 |
| 2 | 504 | 1.0 | 0.59 | 1.0 |
| 3-1 | 504 | 1.1 | 0.29 | 1.05 |
| 3-2 | 504 | 0.1 | 0.62 | 0.05 |

Fig. 11

Abstract Path Resource Information

| Abstract Path | End Point1 | End Point2 | Min Delay Amount(us) | Max Bandwidth at Min Delay (Gbps) | Max Bandwidth without Delay (Gbps) | Highest Cap. Utilization Rate |
|---|---|---|---|---|---|---|
| 1 | CU13 | SW31 | 308 | 0.05 | 1.05 | 0.62 |
| 2 | CU14 | SW31 | *** | ** | ** | *** |
| 3 | DU12 | SW31 | *** | ** | ** | *** |

Fig. 12

Physical Path Resource Information About
Physical Paths Between CU13⇔SW31

| Physical Path | Delay Amount(us) | Maximum Bandwidth (Gbps) | Capacity Utilization Rate | Available Bandwidth (Gbps) |
|---|---|---|---|---|
| 1 | 308 | 0.1 | 0.32 | 0.05 |
| 2 | 504 | 1.0 | 0.59 | 0 |
| 3-1 | 504 | 1.1 | 0.29 | 0.05 |
| 3-2 | 504 | 0.1 | 0.62 | 0.05 |

Fig. 13

Abstract Path Resource Information

| Abstract Path | End Point1 | End Point2 | Min Delay Amount(us) | Max Bandwidth at Min Delay(Gbps) | Max Bandwidth without Delay (Gbps) | Highest Cap. Utilization Rate |
|---|---|---|---|---|---|---|
| 1 | CU13 | SW31 | 308 | 0.05 | 0.05 | 0.62 |
| 2 | CU14 | SW31 | *** | ** | ** | *** |
| 3 | DU12 | SW31 | *** | ** | ** | *** |

Fig. 14

Physical Path Resource Information About
Physical Paths Between CU13⇔SW31

| Physical Path | Delay Amount(us) | Maximum Bandwidth (Gbps) | Capacity Utilization Rate | Available Bandwidth (Gbps) |
|---|---|---|---|---|
| 1 | 308 | 0.1 | 0.32 | 0 |
| 2 | 504 | 1.0 | 0.59 | 0 |
| 3-1 | 504 | 1.1 | 0.29 | 0 |
| 3-2 | 504 | 0.1 | 0.62 | 0 |

Fig. 15

Abstract Path Resource Information

| Abstract Path | End Point1 | End Point2 | Min Delay Amount(us) | Max Bandwidth at Min Delay(Gbps) | Max Bandwidth without Delay (Gbps) | Highest Cap. Utilization Rate |
|---|---|---|---|---|---|---|
| 1 | CU13 | SW31 | 308 | 0 | 0 | 0.62 |
| 2 | CU14 | SW31 | *** | ** | ** | *** |
| 3 | DU12 | SW31 | *** | ** | ** | *** |

Fig. 16

Definition of Classes

| Class | Delay Amount (us) |
|---|---|
| 1 | 0~99 |
| 2 | 100~199 |
| 3 | 200~299 |
| 4 | 300~399 |
| 5 | 400~499 |
| 6 | 500~599 |
| 7 | 600~1000 |

Fig. 17

Physical Path Resource Information (with Classes) About Physical Paths Between CU13⇔SW31

| Physical Path | Class | Delay Amount(us) | Maximum Bandwidth (Gbps) | Capacity Utilization Rate | Available Bandwidth (Gbps) |
|---|---|---|---|---|---|
| 1 | 4 | 308 | 0.1 | 0.32 | 0.1 |
| 2 | 6 | 504 | 1.0 | 0.59 | 1.0 |
| 3-1 | 6 | 504 | 1.1 | 0.29 | 1.1 |
| 3-2 | 6 | 504 | 0.1 | 0.62 | 0.1 |

Fig. 18

Abstract Path Resource Information (with Classes)

| Abstract Path | End Point1 | End Point2 | Class | Maximum Bandwidth (Gbps) | Highest Cap. Utilization Rate |
|---|---|---|---|---|---|
| 1 | CU13 | SW31 | 1 | 0 | 0 |
| | | | 2 | 0 | 0 |
| | | | 3 | 0 | 0 |
| | | | 4 | 0.1 | 0.32 |
| | | | 5 | 0.1 | 0.32 |
| | | | 6 | 1 | 0.62 |
| | | | 7 | 1 | 0.62 |
| 2 | CU14 | SW31 | * | ** | *** |
| 3 | DU12 | SW31 | * | ** | *** |

Fig. 20

Slice Creation Request

| Request ID | End Point1 | End Point2 | Delay Amount(us) | Bandwidth (Gbps) | Capacity Utilization Rate |
|---|---|---|---|---|---|
| 1 | CU13 | SW31 | 200 | 0.05 | 0.1 |
| 2 | CU13 | SW31 | 400 | 0.05 | 0.1 |

CONTROLLER OF A RADIO ACCESS NETWORK

CROSS REFERENCE TO RELATED APPLICATIONS

This application is a Continuation of PCT International Application No. PCT/JP2018/033817, filed on Sep. 12, 2018, which is hereby expressly incorporated by reference into the present application.

TECHNICAL FIELD

The present invention relates to a controller of a radio access network (RAN).

BACKGROUND ART

There are a plurality of services different in conditions demanded of communication, for example, a mobile broadband service in which a high data rate is demanded, a mission-critical service in which high reliability and as little delay as possible are demanded, and a Massive Internet of Things service in which accommodation of high-density devices is demanded. Allocation of those communication services to a slice created on a fifth-generation mobile communication system (5G) is currently being considered.

The slice is a virtual network that has logically been cut out. A controller managing the slice secures, from available resources of devices present in the network, on a device-by-device basis, resources required for a requested communication service and allocates the secured resources to the slice.

A technology of efficiently collecting and managing resources possessed by the devices (for example, see Patent Literature 1) is being studied in order to secure resources required for implementation of a requested communication service from the devices and allocate the secured resources to the slice.

In Patent Literature 1, a controller holds resource information about resources possessed by devices and device-to-device connection information in a table format and, when a request to create a slice is received, sequentially refers to the table of the resource information with respect to devices located along a communication path and the table of the device-to-device connection information.

CITATION LIST

Patent Literature

[PTL 1] JP 2016-116184 A

SUMMARY OF INVENTION

Technical Problem

However, in Patent Literature 1, pieces of the resource information of all devices located along a path that forms the slice are sequentially referred to, and resources found to be available are allocated first. The resultant problem is that a heavy load is applied on the controller when the slice is created.

The present invention has been made to solve the problem described above, and it is an object of the present invention to provide a controller of a radio access network in which a load generated in creation of a slice is light.

Solution to Problem

In order to achieve the above-mentioned object, according to one embodiment of the present invention, there is provided a controller of a radio access network including: a physical network information acquirer configured to acquire resource information of devices in the radio access network and device-to-device connection information; a physical path resource information calculator configured to calculate physical path resource information based on the resource information of the devices and the device-to-device connection information, the physical path resource information being resource information about physical paths between the devices; an abstract path resource information calculator configured to calculate abstract path resource information based on the physical path resource information, the abstract path resource information expressing the physical path resource information in a representative manner; and a slice creator configured to create a slice when receiving a request to create a slice, by determining whether a slice that satisfies a requested condition is creatable based on the abstract path resource information and, when determining that the slice that satisfies the requested condition is creatable, selecting one of the physical paths that satisfies the requested condition based on the physical path resource information.

Advantageous Effects of Invention

According to the controller of the radio access network of the present invention, a load generated in the creation of the slice is reduced.

BRIEF DESCRIPTION OF DRAWINGS

FIG. 3 is an example of resource information of devices of FIG. 1.

FIG. 4 is an example of device-to-device connection information about connection between the devices of FIG. 1.

FIG. 5 is a diagram for illustrating physical paths between a CU 13 and a SW 31 of FIG. 1.

FIG. 6 is physical path resource information about the physical paths between the CU 13 and the SW 31 of FIG. 1.

FIG. 7 is an example of abstract path resource information about abstract paths of FIG. 1.

FIG. 9 is an example of slice creation requests that is used together with description of the flow chart of FIG. 8.

FIG. 10 is the physical path resource information about the physical paths between the CU 13 and the SW 31 after a first update.

FIG. 11 is an example of the abstract path resource information after the first update.

FIG. 12 is the physical path resource information about the physical paths between the CU 13 and the SW 31 after a second update.

FIG. 13 is an example of the abstract path resource information after the second update.

FIG. 14 is the physical path resource information about the physical paths between the CU 13 and the SW 31 after a third update.

FIG. 15 is an example of the abstract path resource information after the third update.

FIG. 16 is an example of a definition of classes in a second embodiment of the present invention.

FIG. 17 is physical path resource information about the physical paths between the CU 13 and SW 31 of FIG. 1.

FIG. 18 is an example of abstract path resource information about the abstract paths of FIG. 1.

FIG. 20 is an example of slice creation requests that is used together with description of the flow chart of FIG. 19.

DESCRIPTION OF EMBODIMENTS

Now, embodiments of the present invention are described in detail with reference to the accompanying drawings. It should be noted, however, that the embodiments described below are merely examples, and the present invention is not limited to those embodiments.

First Embodiment

Figure 1:
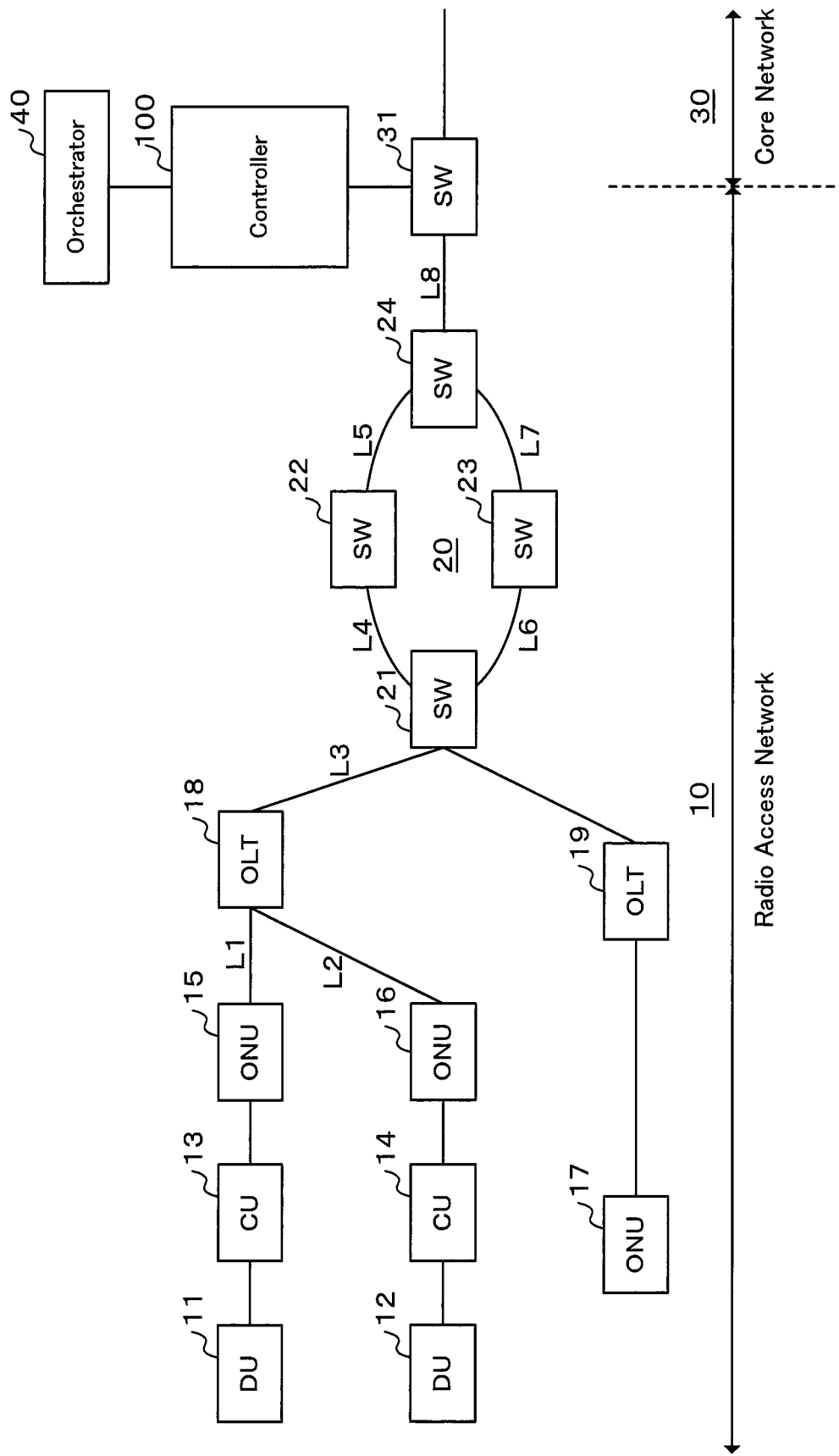
FIG. 1 is an example of a communication system in a first embodiment of the present invention.

FIG. 1 is an example of a communication system in a first embodiment of the present invention. This communication system is a fifth-generation mobile communication system (5G), and includes a radio access network 10 and a core network 30.

The radio access network 10 includes distributed units (DUs) 11 and 12, which are remote stations configured to transmit and receive radio waves, and central units (CUs) 13 and 14, which are aggregation base stations configured to execute data processing of radio base stations.

The CUs 13 and 14 are connected to optical network units (ONUs) 15 and 16, respectively, which are optical line termination devices on a subscriber side. The ONUs 15 and 16 are connected to an optical line terminal (OLT) 18, which is an optical line termination device on a carrier side. Similarly, an ONU 17 is connected to an OLT 19.

The OLTs 18 and 19 are connected to a ring network 20 via a SW 21, which is a switch device. Other than the SW 21, SWs 22, 23, and 24 are connected to the ring network 20.

The SW 24 is connected to the core network 30, which is an upper network, via a SW 31. A controller 100 configured to manage creation of a slice in the radio access network 10 is connected to the SW 31.

The controller 100 is connected to an orchestrator 40, which is a device configured to virtualize the radio access network 10 and perform integrated control on the virtualized radio access network 10.

The physical network connecting the devices described above may be a dedicated network or a shared network over which user data is transmitted. The devices connecting the networks may be router devices instead of switch devices.

Optical access networks may be present between the DU 11 and the CU 13, and between the DU 12 and the CU 14.

Figure 2:
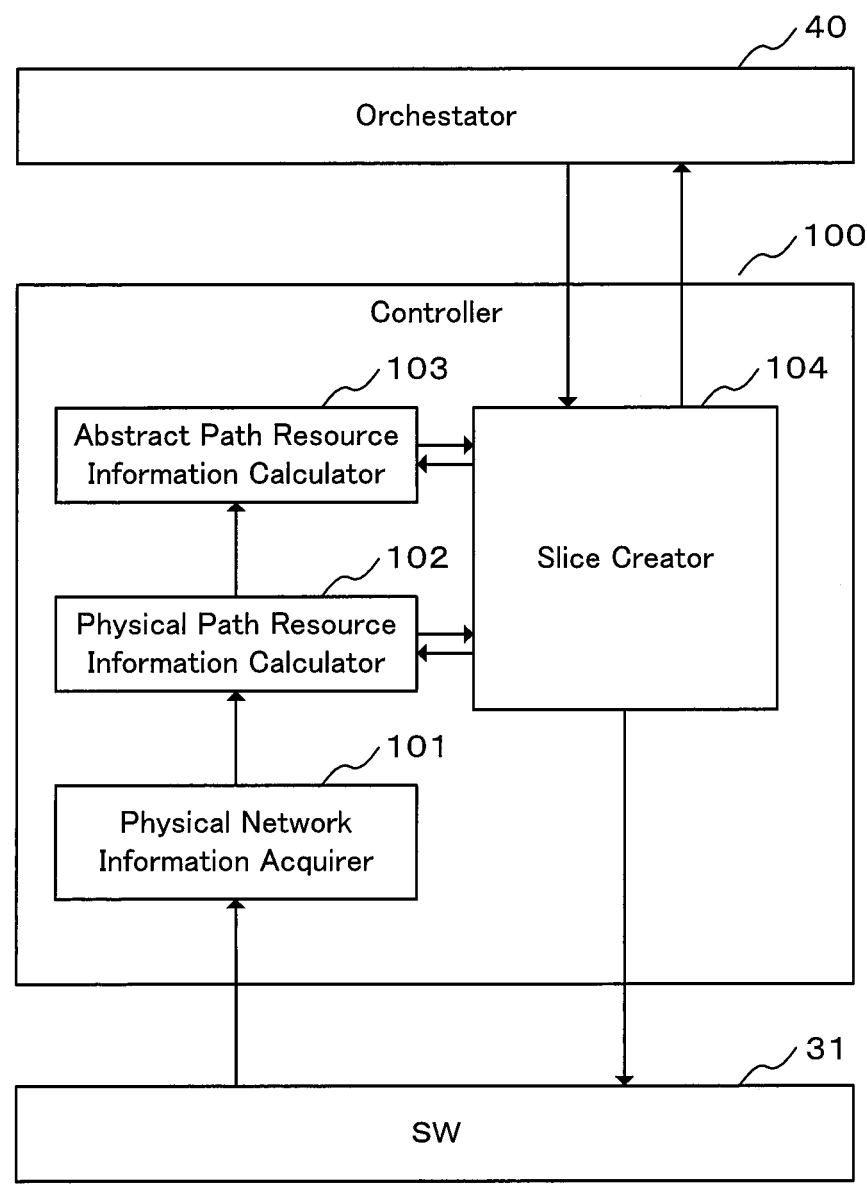
FIG. 2 is a block diagram for illustrating a function configuration of a controller of FIG. 1.

FIG. 2 is a block diagram for illustrating a function configuration of the controller 100 according to the first embodiment of the present invention.

The controller 100 includes a physical network information acquirer 101, a physical path resource information calculator 102, an abstract path resource information calculator 103 and a slice creator 104. The arrows in FIG. 2 indicate flows of data.

(Physical Network Information Acquirer 101)

The physical network information acquirer 101 is configured to acquire resource information of the devices in the radio access network 10 and device-to-device connection information.

FIG. 3 is an example of the resource information of the devices to be acquired by the physical network information acquirer 101. In FIG. 3, the SW 21, for example, has four ports 1 to 4, and the ports 1 to 3 have a maximum bandwidth of 1 Gbps, whereas the port 4 has a maximum bandwidth of 10 Gbps. A "Device Delay" in FIG. 3 is a delay in transfer between ports.

FIG. 4 is an example of the device-to-device connection information to be acquired by the physical network information acquirer 101. In FIG. 4, a link L1, for example, represents connection between a port 1 of the ONU 15 and a port 1 of the OLT 18, has a transfer delay of 100 microseconds and a maximum bandwidth of 1 Gbps, and is 1 Gbps in terms of currently available bandwidth. The device-to-device connection information for one communication direction and the device-to-device connection information for another communication direction may be managed separately.

The physical network information acquirer 101 may use any method to acquire the information of FIG. 3 and FIG. 4, and examples of the specific method thereof include inquiry to the devices, the utilization of a path search protocol, and reading of information kept by a network administrator.

(Physical Path Resource Information Calculator 102) is configured to calculate physical path resource information, which is resource information about physical paths between the devices, based on the resource information of the devices and the device-to-device connection information that have been acquired by the physical network information acquirer 101.

To describe in detail, the physical path resource information calculator 102 first calculates a physical path between any two devices, based on the device-to-device connection information of FIG. 4 that has been acquired by the physical network information acquirer 101.

Physical paths calculated by the physical path resource information calculator 102 include, at least, a physical path between a device connected to an upper network and a device connected to a lower network. Physical paths calculated by the physical path resource information calculator 102 may further include a physical path between particularly specified devices, or may include physical paths between all combinations of two devices.

For example, in FIG. 1, there are three physical paths, namely, physical paths 1 to 3, between the CU 13 and the SW 31 as illustrated in FIG. 5.

The physical path 1 is a physical path that runs along the ring network 20 clockwise from the SW 21 to the SW 24. The physical path 2 is a physical path that runs along the ring network 20 counterclockwise from the SW 21 to the SW 24. The physical path 3 is a physical path that branches in a section from the SW 21 to the SW 24 into two paths, with one path running clockwise along the ring network 20 and the other path running counterclockwise along the ring network 20.

The physical path resource information calculator 102 next calculates physical path resource information, based on the previously calculated physical path between any two devices and on the resource information of the devices shown in FIG. 3 and the device-to-device connection information shown in FIG. 4. The physical path resource information is resource information about a physical path between any two devices.

The physical path resource information calculated by the physical path resource information calculator 102 is, for example, a delay amount, a maximum bandwidth, a capacity utilization rate and an available bandwidth.

FIG. 6 is an illustration of the physical path resource information calculated for the physical paths between the CU 13 and the SW 31 by the physical path resource information calculator 102.

In FIG. 6, the delay amount is calculated by integrating device delays of devices located along the physical path and transfer delays between the devices.

In FIG. 6, the maximum bandwidth is a maximum bandwidth that can be obtained on that physical path and, when a bottleneck is caused by one of the devices, is limited by the bottleneck. That is, the maximum bandwidth is the smallest one of maximum bandwidths of devices located along the physical path and maximum bandwidths between the devices.

In FIG. 6, the capacity utilization rate is calculated by taking into account a connection relationship between devices, that is, whether the devices are connected in series or in parallel, and other factors.

In FIG. 6, the available bandwidth is the smallest one of available bandwidths between the devices located along the physical path.

For the physical path 3 in FIG. 6, it is conceivable that the clockwise physical path and the counterclockwise physical path are used at the same time, and two paths are accordingly calculated, namely, a first physical path 3-1 in which the bandwidth is maximum and a second physical path 3-2 in which the capacity utilization rate is highest.

In FIG. 6, the first physical path 3-1 is a physical path in which the maximum bandwidth is obtained by using both of the physical paths at the same time, and the second physical path 3-2 is a physical path in which the highest capacity utilization rate is obtained by causing one of the two physical paths to operate.

The delay amount of the physical path 3-1 is the larger one of delay amounts of the physical paths 1 and 2. The maximum bandwidth of the physical path 3-1 is the sum of the maximum bandwidths of the physical paths 1 and 2. The capacity utilization rate of the physical path 3-1 is a capacity utilization rate observed when the physical paths 1 and 2 are used at the same time. The available bandwidth of the physical path 3-1 is the sum of available bandwidths of the physical paths 1 and 2.

The delay amount of the physical path 3-2 is the larger one of delay amounts of the physical paths 1 and 2. The maximum bandwidth of the physical path 3-2 is the smaller one of the maximum bandwidths of the physical paths 1 and 2. The capacity utilization rate of the physical path 3-2 is a capacity utilization rate observed when one of the physical paths 1 and 2 is used. The available bandwidth of the physical path 3-2 is the smaller one of available bandwidths of the physical paths 1 and 2.

(Abstract Path Resource Information Calculator 103)

The abstract path resource information calculator 103 is configured to calculate abstract path resource information, which expresses pieces of physical path resource information about a plurality of physical paths between two devices as a representative of the pieces of physical path resource information, based on the physical path resource information calculated by the physical path resource information calculator 102.

FIG. 7 is an example of the abstract path resource information calculated by the abstract path resource information calculator 103. In FIG. 7, as an abstract path 1, for example, a minimum delay amount, a maximum bandwidth at the minimum delay, a maximum bandwidth without consideration to delay, and the highest capacity utilization rate are extracted from pieces of physical path resource information of the four physical paths between the CU 13 and the SW 31 shown in FIG. 6.

In FIG. 7, the minimum delay amount is the smallest one of the delay amounts of the four physical paths. The maximum bandwidth at the minimum delay is the available bandwidth of the physical path that has the smallest delay amount. The maximum bandwidth without consideration to delay is the largest one of the maximum bandwidths of the four physical paths. The highest capacity utilization rate is the highest one of the capacity utilization rates of the four physical paths.

(Slice Creator 104)

The slice creator 104 is configured to determine, when a slice creation request is received from the orchestrator 40, whether a slice that satisfies a requested condition can be created, based on the abstract path resource information calculated by the abstract path resource information calculator 103.

When determining that a slice that satisfies a requested condition can be created, the slice creation unit 104 creates a slice by selecting a physical path that satisfies the requested condition, based on the physical path resource information calculated by the physical path resource information calculator 102.

Figure 8:
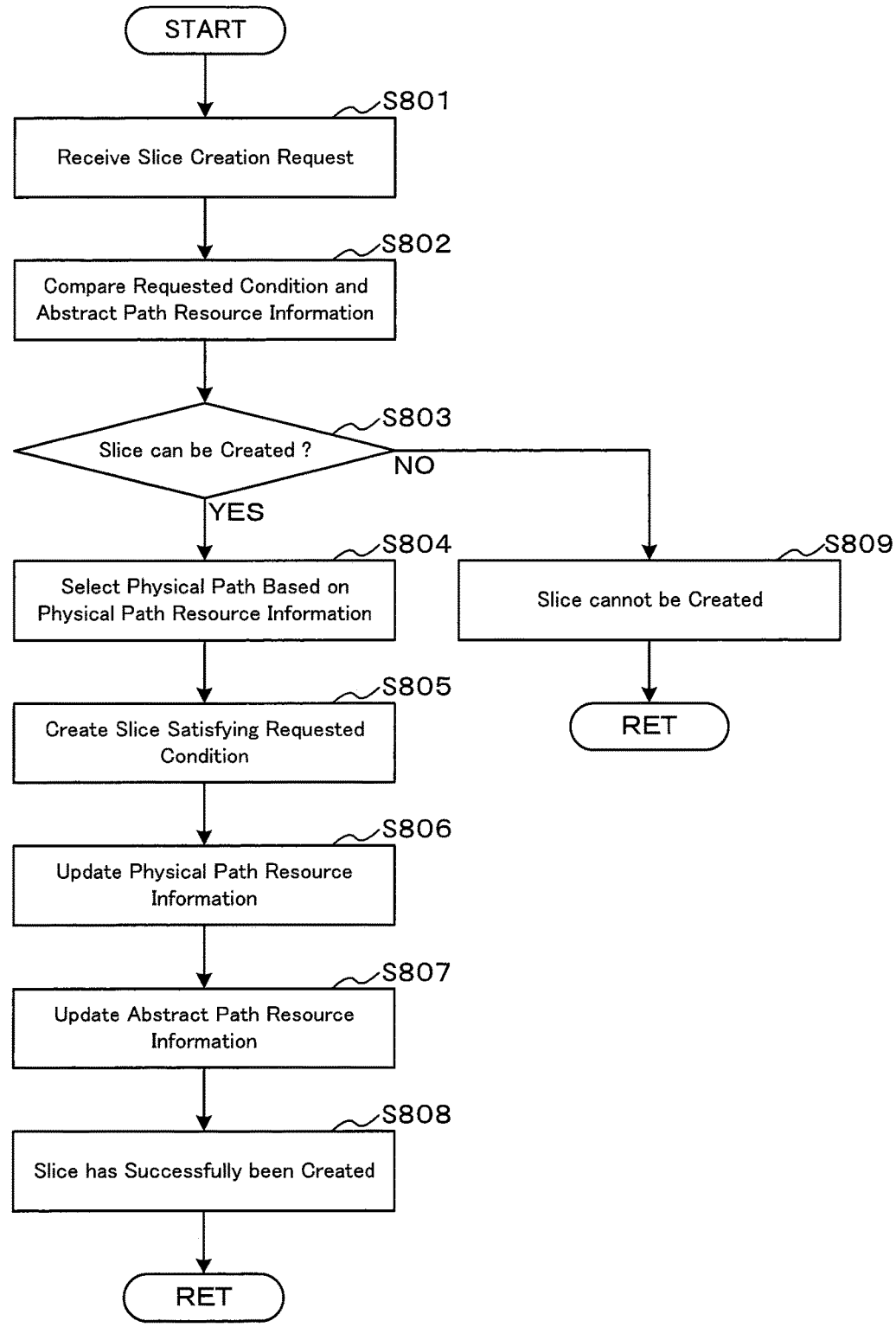
FIG. 8 is a flow chart of slice creation processing by the controller of FIG. 1.

Details of slice creation processing executed by the slice creator 104 are described below with reference to a flow chart of FIG. 8. A premise of the description is that four slice creation requests shown in FIG. 9 are sequentially received from the orchestrator 40.

In Step S801, the slice creator 104 receives, from the orchestrator 40, a slice creation request shown in FIG. 9 that has a request ID 1.

The slice creation request of FIG. 9 that has a request ID 1 is a request to create a slice satisfying conditions that the delay amount be 200 microseconds or less in a physical path between the CU 13 and the SW 31, that the bandwidth be 0.05 Gbps or more, and that the capacity utilization rate be 0.1 or more.

In Step S802, the slice creator 104 compares the requested conditions of the request ID 1 of FIG. 9 and the abstract path resource information of FIG. 7.

In Step S803, the slice creator 104 determines, based on the result of the comparison of Step S802, whether a slice satisfying the requested conditions of the request ID 1 can be created.

The comparison between the requested conditions of the request ID 1 of FIG. 9 and the abstract path resource information of FIG. 7 reveals that no abstract path resource satisfies the condition that the delay amount be 200 microseconds or less between the CU 13 and the SW 31. The processing flow accordingly proceeds to Step S809.

In Step S809, the slice creator 104 sends to the orchestrator 40 a response to the effect that a slice corresponding to the request ID 1 cannot be created. The processing flow then returns to the start.

Next, in Step S801 executed for the second time, the slice creator 104 receives, from the orchestrator 40, a slice creation request shown in FIG. 9 that has a request ID 2.

The slice creation request of FIG. 9 that has a request ID 2 is a request to create a slice satisfying conditions that the delay amount be 400 microseconds or less in a physical path between the CU 13 and the SW 31, that the bandwidth be 0.05 Gbps or more, and that the capacity utilization rate be 0.1 or more.

In Step S802, the slice creator 104 compares the requested conditions of the request ID 2 of FIG. 9 and the abstract path resource information of FIG. 7.

In Step S803, the slice creator 104 determines, based on the result of the comparison of Step S802, whether a slice satisfying the requested conditions of the request ID 2 can be created.

The comparison between the requested conditions of the request ID 2 of FIG. 9 and the abstract path resource information of FIG. 7 reveals that the abstract path 1 has abstract path resources satisfying the conditions that the delay amount be 400 microseconds or less between the CU 13 and the SW 31, that the bandwidth be 0.05 Gbps or more, and that the capacity utilization rate be 0.1 or more. The processing flow accordingly proceeds to Step S804.

In Step S804, the slice creator 104 selects the physical path 1 which has physical path resources satisfying the requested conditions of the request ID 2, from the physical path resource information of FIG. 6.

In Step S805, the slice creator 104 creates a slice satisfying the requested conditions of the request ID 2. To describe in detail, the slice creator 104 instructs devices between the CU 13 and the SW 31 to secure required resources, via a setting interface of each of the devices.

In Step S806, the slice creator 104 updates the physical path resource information of FIG. 6. To describe in detail, after the creation of the slice of the request ID 2 is completed, the physical path resource information of FIG. 6 is updated as shown in FIG. 10.

To give more detail, the maximum bandwidth of the physical path 1 is updated from 0.1 Gbps to 0.05 Gbps. The maximum bandwidth of the physical path 3-1 which shares a path with the physical path 1 is updated as well, from 1.1 Gbps to 1.05 Gbps. Similarly, the maximum bandwidth of the physical path 3-2 which shares a path with the physical path 1 is updated from 0.1 Gbps to 0.05 Gbps. For easy understanding, the updated values are underlined in FIG. 10.

In Step S807, the slice creator 104 updates the abstract path resource information of FIG. 7. To describe in detail, after the creation of the slice of the request ID 2 is completed, the abstract path resource information of FIG. 7 is updated as shown in FIG. 11.

To give more detail, the maximum bandwidth of the abstract path 1 at the minimum delay is updated from 0.1 Gbps to 0.05 Gbps, and the maximum bandwidth of the abstract path 1 without consideration to delay is updated from 1.1 Gbps to 1.05 Gbps. For easy understanding, the updated values are underlined in FIG. 11.

In Step S808, the slice creator 104 sends to the orchestrator 40 a response to the effect that the slice of the request ID 2 has successfully been created. The processing flow then returns to the start.

Next, in Step S801 executed for the third time, the slice creator 104 receives, from the orchestrator 40, a slice creation request shown in FIG. 9 that has a request ID 3.

The slice creation request of FIG. 9 that has a request ID 3 is a request to create a slice satisfying conditions that the delay amount be 600 microseconds or less in a physical path between the CU 13 and the SW 31, that the bandwidth be 1.0 Gbps or more, and that the capacity utilization rate be 1.0 or more.

In Step S802, the slice creator 104 compares the requested conditions of the request ID 3 of FIG. 9 and the abstract path resource information of FIG. 11.

In Step S803, the slice creator 104 determines, based on the result of the comparison of Step S802, whether a slice satisfying the requested conditions of the request ID 3 can be created.

The comparison between the requested conditions of the request ID 3 of FIG. 9 and the abstract path resource information of FIG. 11 reveals that the abstract path 1 has abstract path resources satisfying the conditions that the delay amount be 600 microseconds or less between the CU 13 and the SW 31, that the bandwidth be 1.0 Gbps or more, and that the capacity utilization rate be 0.1 or more. The processing flow accordingly proceeds to Step S804.

In Step S804, the slice creator 104 selects the physical path 2 which has physical path resources satisfying the conditions of the request ID 3, from the physical path resource information of FIG. 10.

In Step S805, the slice creator 104 creates a slice satisfying the requested conditions of the request ID 3. To describe in detail, the slice creator 104 instructs the devices between the CU 13 and the SW 31 to secure required resources, via the setting interface of each of the devices.

In Step S806, the slice creator 104 updates the physical path resource information of FIG. 10. To describe in detail, after the creation of the slice of the request ID 3 is completed, the physical path resource information of FIG. 10 is updated as shown in FIG. 12.

To give more detail, the available bandwidth of the physical path 2 is updated from 1.0 Gbps to 0 Gbps. The available bandwidth of the physical path 3-1 which shares a path with the physical path 2 is updated as well, from 1.05 Gbps to 0.05 Gbps. The maximum bandwidth of the physical path 3-2 which shares a path with the physical path 2 remains 0.05 Gbps. For easy understanding, the updated value is underlined in FIG. 12.

In Step S807, the slice creator 104 updates the abstract path resource information of FIG. 11. To describe in detail, after the creation of the slice of the request ID 3 is completed, the abstract path resource information of FIG. 11 is updated as shown in FIG. 13.

To give more detail, the maximum bandwidth of the abstract path 1 at the minimum delay remains 0.05 Gbps, and the maximum bandwidth of the abstract path 1 without consideration to delay is updated from 1.05 Gbps to 0.05 Gbps. For easy understanding, the updated value is underlined in FIG. 13.

In Step S808, the slice creator 104 sends to the orchestrator 40 a response to the effect that the slice of the request ID 3 has successfully been created. The processing flow then returns to the start.

Next, in Step S801 executed for the fourth time, the slice creator 104 receives, from the orchestrator 40, a slice creation request shown in FIG. 9 that has a request ID 4.

The slice creation request of FIG. 9 that has a request ID 4 is a request to create a slice satisfying conditions that the delay amount be 600 microseconds or less in a physical path between the CU 13 and the SW 31, that the bandwidth be 0.05 Gbps or more, and that the capacity utilization rate be 0.6 or more.

In Step S802, the slice creator 104 compares the requested conditions of the request ID 4 of FIG. 9 and the abstract path resource information of FIG. 13.

In Step S803, the slice creator 104 determines, based on the result of the comparison of Step S802, whether a slice satisfying the requested conditions of the request ID 4 can be created.

The comparison between the requested conditions of the request ID 4 of FIG. 9 and the abstract path resource information of FIG. 13 reveals that the abstract path 1 has abstract path resources satisfying the conditions that the delay amount be 600 microseconds or less between the CU 13 and the SW 31, that the bandwidth be 0.05 Gbps or more, and that the capacity utilization rate be 0.6 or more. The processing flow accordingly proceeds to Step S804.

In Step S804, the slice creator 104 selects the physical path 3-2 which has physical path resources satisfying the requested conditions of the request ID 4, from the physical path resource information of FIG. 12.

In Step S805, the slice creator 104 creates a slice satisfying the requested conditions of the request ID 4. To describe in detail, the slice creator 104 instructs the devices between the CU 13 and the SW 31 to secure required resources, via the setting interface of each of the devices.

In Step S806, the slice creator 104 updates the physical path resource information of FIG. 12. To describe in detail, after the creation of the slice of the request ID 4 is completed, the physical path resource information of FIG. 12 is updated as shown in FIG. 14.

To give more detail, the available bandwidth of the physical path 3-2 is updated from 0.05 Gbps to 0 Gbps. The available bandwidth of the physical path 1 which shares a path with the physical path 3-2 is updated as well, from 0.05 Gbps to 0 Gbps. Similarly, the available bandwidth of the physical path 3-1 is updated to 0 Gbps. For easy understanding, the updated values are underlined in FIG. 14.

In Step S807, the slice creator 104 updates the abstract path resource information of FIG. 13. To describe in detail, after the creation of the slice of the request ID 3 is completed, the abstract path resource information of FIG. 13 is updated as shown in FIG. 15.

To give more detail, the maximum bandwidth of the abstract path 1 at the minimum delay is updated to 0 Gbps, and the maximum bandwidth of the abstract path 1 without consideration to delay is updated from 0.05 Gbps to 0 Gbps. For easy understanding, the updated values are underlined in FIG. 15.

In Step S808, the slice creator 104 sends to the orchestrator 40 a response to the effect that the slice of the request I 43 has successfully been created. The processing flow then returns to the start.

As described above, the controller of the radio access network according to the first embodiment of the present invention determines, when receiving a request to create a slice, whether a slice that satisfies a requested condition can be created based on the abstract path resource information and, when determining that a slice that satisfies the requested condition can be created, creates the slice by selecting a physical path that satisfies the requested condition based on the physical path resource information.

The controller can determine whether a slice satisfying a requested condition can be created, without referring to the resource information of the devices and the device-to-device connection information. This greatly reduces a load generated in the creation of a slice.

In the first embodiment, the delay amount, the maximum bandwidth, the capacity utilization rate, an available bandwidth, and the like are considered as communication resources. Other than those, a memory capacity for communication, a frame loss rate, a transmission delay fluctuation amount, a processing delay fluctuation amount, and the like may further be considered as communication resources.

Second Embodiment

A communication system and controller according to a second embodiment of the present invention have the same configurations as those of the first embodiment which are illustrated in FIG. 1 and FIG. 2. The following description focuses on differences between the first embodiment and the second embodiment.

The physical path resource information calculator 102 in the second embodiment classifies physical paths into a plurality of classes based on the delay amount, when calculating physical path resource information.

To describe in detail, the physical path resource information calculator 102 preliminary keeps a classification table defined in FIG. 16. When calculating physical path resource information, the physical path resource information calculator 102 classifies each physical path into one of Classes 1 to 7 based on the delay amount.

FIG. 17 is physical path resource information calculated by the physical path resource information calculator 102 in the second embodiment about physical paths between the CU 13 and the SW 31. The physical path resource information of FIG. 17 includes information about the classes defined in FIG. 16.

FIG. 18 is an example of abstract path resource information that is calculated by the abstract path resource information calculator 103 in the second embodiment. In FIG. 18, for the abstract path 1, for example, seven paths corresponding to Classes 1 to 7 are calculated.

The bandwidth of each class in the abstract path 1 is the largest one of maximum bandwidths of physical paths classified into classes that are smaller in delay amount than that class. The capacity utilization rate of each class in the abstract path 1 is the highest of the capacity utilization rates of physical paths classified into classes that are smaller in delay amount than that class.

Figure 19:
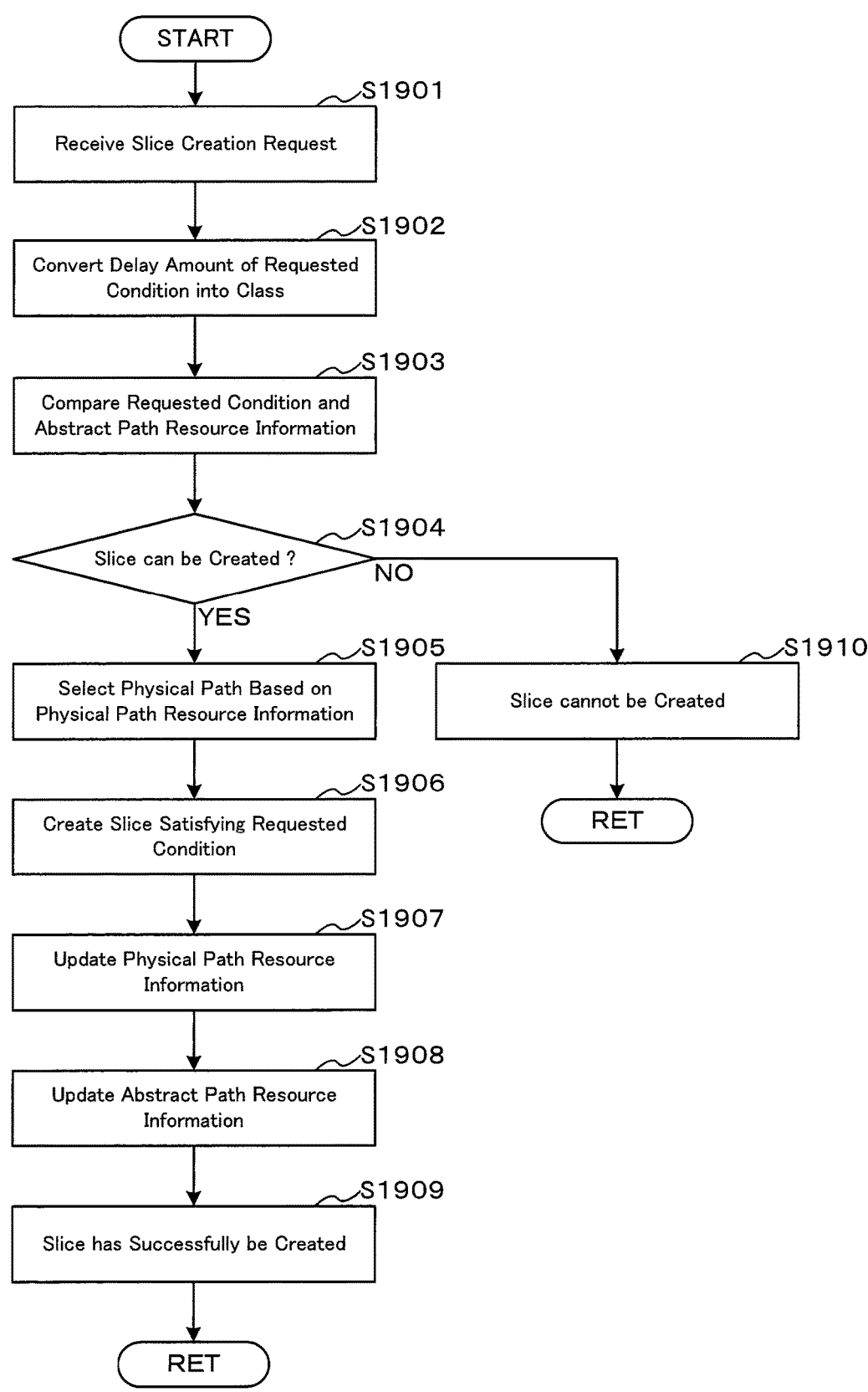
FIG. 19 is a flow chart of the slice creation processing by the controller of FIG. 1.

Next, slice creation processing executed by the slice creator 104 in the second embodiment is described with reference to a flow chart of FIG. 19. A premise of the description is that two slice creation requests shown in FIG. 20 are sequentially received from the orchestrator 40.

In Step S1901, the slice creator 104 receives, from the orchestrator 40, a slice creation request shown in FIG. 20 that has a request ID 1.

The slice creation request of FIG. 20 that has a request ID 1 is a request to create a slice satisfying conditions that the delay amount be 200 microseconds or less in a physical path between the CU 13 and the SW 31, that the bandwidth be 0.05 Gbps or more, and that the capacity utilization rate be 0.1 or more.

In Step S1902, the slice creator 104 converts the delay amount in the requested conditions of the request ID 1 into a class. To describe in detail, the slice creator 104 converts the delay amount of the request ID 1 into Class 4 of FIG. 16 because the requested delay amount of the request ID 1 is 200 microseconds or less. Alternatively, the orchestrator 40 may transmit a creation request that includes a class value.

In Step S1903, the slice creator 104 compares the requested conditions of the request ID 1 which include "Class 4" and the abstract path resource information of FIG. 18.

In Step S1904, the slice creator 104 determines whether a slice satisfying the requested conditions of the request ID 1 which include "Class 4" can be created based on the result of the comparison of Step S1903.

The comparison between the requested conditions of the request ID 1 which include "Class 4" and the abstract path resource information of FIG. 18 reveals that no abstract path resource satisfies the requested conditions "Class 4", "bandwidth: 0.05 Gbps or more", and "capacity utilization rate: 0.1 or more" between the CU 13 and the SW 31. The processing flow accordingly proceeds to Step S1910.

In Step S1910, the slice creator 104 sends to the orchestrator 40 a response to the effect that a slice corresponding to the request ID 1 cannot be created. The processing flow then returns to the start.

Next, in Step S1901 executed for the second time, the slice creator 104 receives, from the orchestrator 40, a slice creation request shown in FIG. 20 that has a request ID 2.

The slice creation request of FIG. 20 that has a request ID 2 is a request to create a slice satisfying conditions that the delay amount be 400 microseconds or less in a physical path between the CU 13 and the SW 31, that the bandwidth be 0.05 Gbps or more, and that the capacity utilization rate be 0.1 or more.

In Step S1902, the slice creator 104 converts the delay amount of the request ID 2 into a class. To describe in detail, the slice creator 104 converts the delay amount of the request ID 2 into Class 5 of FIG. 16 because the requested delay amount of the request ID 2 is 400 microseconds or less.

In Step S1903, the slice creator 104 compares the requested conditions of the request ID 2 which include "Class 5" and the abstract path resource information of FIG. 18.

In Step S1904, the slice creator 104 determines whether a slice satisfying the requested conditions of the request ID 3 which include "Class 5" can be created based on the result of the comparison of Step S1903.

The comparison between the requested conditions of the request ID 2 of FIG. 20 which include "Class 5" and the abstract path resource information of FIG. 18 reveals that the abstract path 1 has abstract path resources that are Class 5 or lower and satisfy the requested conditions between the CU 13 and the SW 31. The processing flow accordingly proceeds to Step S1905.

In Step S1905, the slice creator 104 selects the physical path 1 which has physical path resources satisfying the requested conditions of the request ID 2, from the physical path resource information of FIG. 17.

In Step S1906, the slice creator 104 creates a slice satisfying the requested conditions of the request ID 2. To describe in detail, the slice creator 104 instructs the devices between the CU 13 and the SW 31 to secure required resources, via the setting interface of each of the devices.

In Step S1907, the slice creator 104 updates the physical path resource information of FIG. 17.

In Step S1908, the slice creator 104 updates the abstract path resource information of FIG. 18.

In Step S1909, the slice creator 104 sends to the orchestrator 40 a response to the effect that the slice of the request ID 2 has successfully been created. The processing flow then returns to the start.

As described above, the controller of the radio access system according to the second embodiment of the present invention classifies physical paths into a plurality of classes based on the delay amount, when calculating physical path resource information. This further facilitates a search for a physical path that satisfies a requested condition.

In the second embodiment, physical paths are classified into classes based on the delay amount, but may be classified into classes based on the bandwidth. Physical paths may also be classified into classes based on the delay amount and the bandwidth both.

The functions in the controller 100 of a radio access network according to the first and second embodiments described above may not be included in a single device. That is, it is sufficient for the physical network information acquirer 101, the physical path resource information calculator 102, the abstract path resource information calculator 103 and the slice creator 104 to be included in the communication network of FIG. 1.

Figure 21:
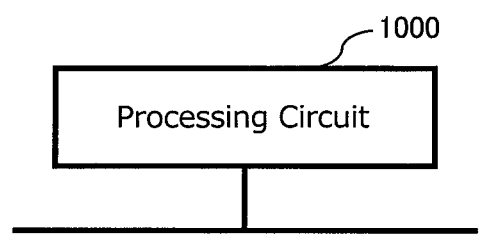
FIG. 21 is a diagram for illustrating a configuration for a case of implementing functions of the controller of the radio access network according to the first and second embodiments of the present invention with a processing circuit that is dedicated hardware.
Figure 22:
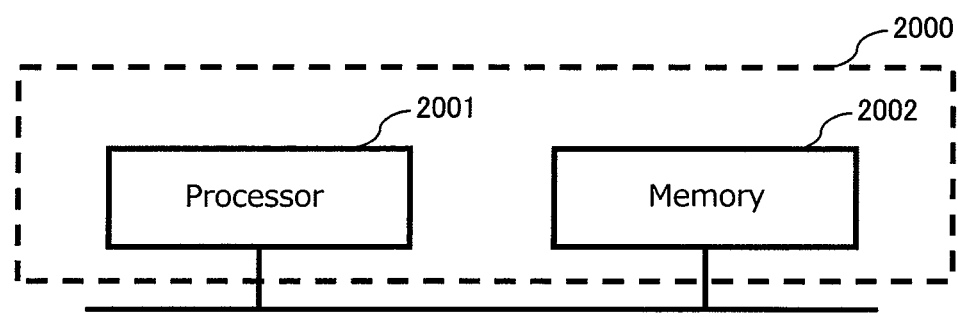
FIG. 22 is a diagram for illustrating a configuration for a case of implementing functions of the controller of the radio access network according to the first embodiment of the present invention with a processing circuit that includes a processor and a memory.

The functions in the controller 100 of a radio access network according to the first and second embodiments described above are implemented by a processing circuit. The processing circuit implementing the functions may be a dedicated piece of hardware, or may be a processor configured to execute a program stored in a memory. FIG. 21 is a diagram for illustrating a configuration for a case of implementing the functions of the controller 100 of a radio access network according to the first embodiment of the present invention with a processing circuit 1000 which is dedicated hardware. FIG. 22 is a diagram for illustrating a configuration for a case of implementing the functions of the controller 100 of a radio access network according to the first and second embodiments of the present invention with a processing circuit 2000 which includes a processor 2001 and a memory 2002.

When the processing circuit is a dedicated piece of hardware, the processing circuit 1000 corresponds to, for example, a single circuit, a composite circuit, a programmed processor, a parallel-programmed processor, an application specific integrated circuit (ASIC), field programmable gate array (FPGA), or a combination thereof. The function of the physical network information acquirer 101, the function of the physical path resource information calculator 102, the function of the abstract path resource information calculator 103 and the function of the slice creator 104 may each be implemented by a separate processing circuit 1000, or the functions of the respective units may together be implemented by one processing circuit 1000.

When the processing circuit is the processor 2001, on the other hand, the functions of the physical network information acquirer 101, the physical path resource information calculator 102, the abstract path resource information calculator 103 and the slice creator 104 are implemented by software, firmware, or a combination of software and firmware. The software and the firmware are written as programs, and stored in the memory 2002. The processor 2001 reads out and executes the program stored in the memory 2002, to thereby implement the function of each unit. That is, when an elevator system includes the memory 2002 for storing programs for causing Steps S801 to S809 and Steps S1901 to S1910 to be executed resultantly when being executed by the processing circuit 2000.

It is understood that those programs cause the computer to execute procedures and methods for the respective units described above. In this case, the memory 2002 corresponds to, for example, a random access memory (RAM), a read only memory (ROM), a flash memory, an erasable programmable read only memory (EPROM), an electrically erasable and programmable read only memory (EEPROM), or other such non-volatility or volatile semiconductor memory. A magnetic disk, a flexible disk, an optical disc, a compact disc, a MiniDisc, a DVD, and the like correspond to the memory 2002 as well.

Some parts of the functions of the respective units described above may be implemented by dedicated hardware, and other parts may be implemented by software or firmware.

In this manner, the processing circuit can implement the functions of the respective units described above by hardware, software, firmware, or a combination thereof.

REFERENCE SIGNS LIST 10 radio access network, 100 controller, 101 physical network information acquirer, 102 physical path resource information calculator, 103 abstract path resource information calculator, 104 slice creator

The invention claimed is:

1. A controller of a radio access network, comprising:
a physical network information acquirer configured to acquire resource information of devices in the radio access network and device-to-device connection information;
a physical path resource information calculator configured to calculate physical path resource information based on the resource information of the devices and the device-to-device connection information, the physical path resource information being resource information about physical paths between the devices;
an abstract path resource information calculator configured to calculate abstract path resource information based on the physical path resource information, the abstract path resource information expressing the physical path resource information in a representative manner; and
a slice creator configured to create a slice when receiving a request to create a slice, by determining whether a slice that satisfies a requested condition is creatable based on the abstract path resource information and, when determining that the slice that satisfies the requested condition is creatable, selecting one of the physical paths that satisfies the requested condition based on the physical path resource information.

2. The controller according to claim 1,
wherein the resource information of the devices includes delays of the devices, capacity utilization rates of the devices and bandwidths of ports of the devices, and
wherein the device-to-device connection information includes a connection relationship between the ports of the devices, a transmission delay between the ports and an available bandwidth between the ports.

3. The controller according to claim 1, wherein the physical path resource information includes a delay amount, a maximum bandwidth, a capacity utilization rate and an available bandwidth of each of the physical paths.

4. The controller according to claim 3, wherein the physical path resource information calculator is configured to:
calculate the delay amount of one of the physical paths by integrating device delays of the devices that are located on the one of the physical paths and transmission delays between the devices;
use, as the maximum bandwidth of the one of the physical paths, the smallest maximum bandwidth of the maximum bandwidths of the devices that are located on the one of the physical paths and the maximum bandwidths between the devices; and
use, as the available bandwidth of the one of the physical paths, the smallest available bandwidth of the available bandwidths between the devices that are located on the one of the physical paths.

5. The controller according to claim 4,
wherein the physical path resource information calculator is configured to further calculate, when there are a plurality of physical paths between the devices, a first physical path based on the plurality of physical paths,
wherein the first physical path has a delay amount that is the largest delay amount of delay amounts of the plurality of physical paths,
wherein the first physical path has a maximum bandwidth that is a sum of maximum bandwidths of the plurality of physical paths,
wherein the first physical path has a capacity utilization rate that is a capacity utilization rate observed when the plurality of physical paths are used at the same time, and
wherein the first physical path has an available bandwidth that is a sum of available bandwidths of the plurality of physical paths.

6. The controller according to claim 4,
wherein the physical path resource information calculator is configured to further calculate, when there are a plurality of physical paths between the devices, a second physical path based on the plurality of physical paths,
wherein the second physical path has a delay amount that is the largest delay amount of delay amounts of the plurality of physical paths,
wherein the second physical path has a maximum bandwidth that is the smallest maximum bandwidth of maximum bandwidths of the plurality of physical paths,
wherein the second physical path has a capacity utilization rate that is a capacity utilization rate observed when one of the plurality of physical paths is used, and
wherein the second physical path has an available bandwidth that is the smallest available bandwidth of available bandwidths of the plurality of physical paths.

7. The controller according to claim 1, wherein the abstract path resource information includes a minimum delay amount, a maximum bandwidth at the minimum delay, a maximum bandwidth without consideration to delay and a highest capacity utilization rate.

8. The controller according to claim 7, wherein the abstract path resource information calculator is configured to use, when there are a plurality of physical paths between the devices:
a smallest delay amount of delay amounts of the plurality of physical paths as the minimum delay amount in the abstract path resource information;
an available bandwidth of one of the plurality of physical paths that has the smallest delay amount as the maximum bandwidth at the minimum delay in the abstract path resource information;
a largest maximum bandwidth of maximum bandwidths of the plurality of physical paths as the maximum bandwidth without consideration to delay in the abstract path resource information; and the highest capacity utilization rate of capacity utilization rates of the plurality of physical paths as the highest capacity utilization rate in the abstract path resource information.

9. The controller according to claim 1,
wherein the physical path resource information calculator is configured to classify, when calculating the physical path resource information, the physical paths into a plurality of classes based on delay amounts,
wherein the abstract path resource information calculator is configured to calculate, when calculating the abstract path resource information, a plurality of abstract paths corresponding to the plurality of classes,
wherein a bandwidth of each of the plurality of classes in the plurality of abstract paths is the largest maximum bandwidth of maximum bandwidths of the physical paths that are classified into classes smaller in delay amount than the each of the plurality of classes,
wherein a capacity utilization rate of each of the plurality of classes in the plurality of abstract paths is the highest capacity utilization rate of capacity utilization rates of the physical paths that are classified into classes smaller in delay amount than the each of the plurality of classes, and
wherein the slice creator is configured to create a slice when receiving a request to create a slice, by determining whether a slice that satisfies a requested condition is creatable based further on values of the plurality of classes in the abstract path resource information and, when determining that the slice that satisfies the requested condition is creatable, selecting one of the physical paths that satisfies the requested condition based further on the values of the plurality of classes in the physical path resource information.

10. A communication system, comprising:
a physical network information acquirer configured to acquire resource information of devices in a radio access network and device-to-device connection information;
a physical path resource information calculator configured to calculate physical path resource information based on the resource information of the devices and the device-to-device connection information, the physical path resource information being resource information about physical paths between the devices;
an abstract path resource information calculator configured to calculate abstract path resource information based on the physical path resource information, the abstract path resource information expressing the physical path resource information in a representative manner; and
a slice creator configured to create a slice when receiving a request to create a slice, by determining whether a slice that satisfies a requested condition is creatable based on the abstract path resource information and, when determining that the slice that satisfies the requested condition is creatable, selecting one of the physical paths that satisfies the requested condition based on the physical path resource information.

\* \* \* \* \*